(12) United States Patent
Levitin et al.

(10) Patent No.: US 6,565,744 B2
(45) Date of Patent: May 20, 2003

(54) WASTE WATER CLEANING SYSTEM

(76) Inventors: Mikhail Levitin, P.O. Box 102, Reeders, PA (US) 18352; Boris Khaytin, P.O. Box 102, Reeders, PA (US) 18352

(*) Notice: Subject to any disclaimer, the term of this patent is extended or adjusted under 35 U.S.C. 154(b) by 0 days.

(21) Appl. No.: 09/947,599

(22) Filed: Sep. 7, 2001

(65) Prior Publication Data

US 2003/0047499 A1 Mar. 13, 2003

(51) Int. Cl.[7] .............................. C02F 1/02; C02F 1/40; C02F 1/465; C02F 1/48; C05F 7/00
(52) U.S. Cl. ................... 210/181; 210/182; 210/202; 210/218; 210/223; 210/258; 210/259; 210/748; 71/12; 48/197 A
(58) Field of Search .................. 210/695, 748, 210/754, 758, 760, 799, 804, 177, 181, 182, 201, 202, 218, 220, 221.1, 222, 223, 252, 258, 259; 71/12; 48/197 A

(56) References Cited

U.S. PATENT DOCUMENTS

| | | | | | |
|---|---|---|---|---|---|
| 3,383,309 A | * | 5/1968 | Chandler | ................... | 210/603 |
| 3,622,002 A | * | 11/1971 | Kirk | .................... | 210/105 |
| 3,687,646 A | * | 8/1972 | Brent et al. | ............. | 48/209 |
| 4,046,689 A | * | 9/1977 | Argyll | .................... | 71/12 |
| 4,093,516 A | * | 6/1978 | Lang | ..................... | 435/165 |
| 4,393,166 A | * | 7/1983 | Reischl et al. | ............. | 525/27 |
| 4,454,259 A | * | 6/1984 | Reischl et al. | ............. | 523/129 |
| 4,710,300 A | * | 12/1987 | Kristoufek | ............... | 210/603 |
| 4,793,927 A | * | 12/1988 | Meehan et al. | ......... | 405/129.25 |
| 5,009,791 A | * | 4/1991 | Lin et al. | ................ | 210/695 |
| 5,120,435 A | * | 6/1992 | Fink | ........................ | 210/192 |
| 5,275,732 A | * | 1/1994 | Wang et al. | ............. | 210/601 |
| 5,422,015 A | * | 6/1995 | Angell et al. | ............. | 588/257 |
| 5,435,920 A | * | 7/1995 | Penth | ...................... | 210/708 |
| 5,482,528 A | * | 1/1996 | Angell et al. | ................ | 71/12 |
| 5,514,282 A | * | 5/1996 | Hibbard et al. | ............ | 210/652 |
| 5,679,258 A | * | 10/1997 | Petersen | ................ | 210/703 |
| 5,728,305 A | * | 3/1998 | Hawkinson | ............ | 210/760 |
| 5,753,124 A | * | 5/1998 | Bogatin et al. | ........... | 210/695 |
| 5,916,437 A | * | 6/1999 | Levitin | ................... | 210/177 |

* cited by examiner

Primary Examiner—Fred Prince

(57) ABSTRACT

The present invention provides treatment of wastewater containing oil, organic and inorganic industrial compounds, urea, and e.t.c. The resulting products will be purified water, dry fertilizer, pure carbomide, uncontaminated gas and liquid fuel, and other products that can be separated from the concentrate after ultrafiltration. In order to accomplish those and other objectives the present invention improves the system for cleaning wastewater by subjecting the wastewater to a magnetic field and heating it before the initial settling process. In addition, before ultrafiltration, the liquid is treated in an electroflotation device. The wastewater cleaning system can also be comprised of a urea separator for separating urea from other products.

3 Claims, 3 Drawing Sheets

WASTE WATER CLEANING SYSTEM

INTRODUCTION

The present invention relates generally to a wastewater cleaning system and more particularly to a system for cleaning industrial, agricultural or municipal water.

BACKGROUND OF THE INVENTION

The present invention is related to the invention disclosed in U.S. Pat. No. 4,093,516 to Long, issued Jun. 6, 1978, the specification of which is incorporated by reference. The typical process of cleaning crude sewage involves filtration. The filtration process results in two separated parallel flows, one of which consists of sediment, and the other of filtrate. The filtrate is then aerated by air or oxygen in order to oxidize organic contaminants and is then allowed to settle for a period of time. Formed sediment is mixed with sediment collected after preliminary filtration and then converted into liquid fuel. Settled water from the filtrate is decanted and sterilized resulting in treated water. However, the preliminary filtration and subsequent aeration leads to increasing the concentration of dissolved and fine suspended substances which cannot be separated easily from water in the following steps of cleaning.

In U.S. Pat. No. 5,514,282, to Hibbard et all., issued May 6, 1996, solids.contained in wastewater are separated by air flotation by means of adding some coagulators, for example, iron salts and polymeric flocculates. In addition, after the flotation process wastewater is cleaned by multistage filtration using first a fine filter and then an ultrafilter.

However, treated water needs additional cleaning before it may be used for municipal or industrial consumption because it contains too many dissolved contaminants.

In U.S. Pat. No. 5,520,435, to Fink, issued Jun. 9, 1996, wastewater is treated first by the separation of liquid from solid. This process results in increasing the concentration of dissolved and fine suspended substances in treated water.

In U.S. Pat. No. 5916437, to Levitin, issued Jun. 9, 1999, domestic sewage after the initial settling process, forms two parallel flows, one containing liquid and crude sediment (0.2 mm and greater) and the other containing liquid and fine particles (less than 0.2 mm). The two flows are treated separately. As a result pure water, fertilizer, liquid fuel, and gas fuel containing mainly methane, is obtained. During this process some valuable compounds contained in the domestic and industrial wastewater could be lost in the treatment process.

Therefore, in previous patents the treated water requires additional complicated cleaning processes before use for domestic or industrial consumption.

In conclusion, a need exists for developing an economical and effective wastewater cleaning system producing treated water with the degree of purity that can be used for domestic and industrial consumption.

SUMMARY OF THE INVENTION

The present invention provides treatment of wastewater containing oil, some industrial organic compounds such as urea, as well as inorganic compounds. The resulting products will be purified water, dry fertilizer, pure carbomide, uncontaminated liquid and gas fuel, and other products that can be separated from the concentrate after ultrafiltration. In order to accomplish these and other objectives the present invention improves the system for cleaning wastewater by subjecting the wastewater to a magnetic field and then heating it before the initial settling process. In addition, before ultrafiltration, the liquid is treated in an electroflotation device. The first settling process results in the formation of two separate parallel flows:

1. settled wastewater containing water-soluble compounds such as salts and urea;
2. sediment containing insoluble solids.

More specifically, a preferred embodiment of the present invention includes a settler with an inlet through which raw wastewater is introduced, and two outlets, through one of which settled wastewater is discharged and another through which sediment containing solids is discharged; a heater with an outlet through which the heated settled wastewater is discharged; a magnetic device with an outlet through which heated settled wastewater is discharged; a low-pressure separator for separating small-sized solid particles and oil droplets by flotation with air bubbles generated into the settled heated wastewater when the intake pressure becomes lower than ambient atmospheric pressure; a pump lowering the intake pressure relative to ambient pressure in the low-pressure separator, which is achieved by draining pretreated wastewater formed after treatment in the low-pressure separator; a pre-heater for heating pretreated wastewater; an aerator for oxidizing organic compounds contained in the pretreated wastewater; an electroflotation device for treating the pretreated wastewater by an electrical current; an ultrafilter for the final cleaning of treated wastewater discharged from the aerator resulting in the production of the effluent wastewater; a sterilizer of the effluent wastewater resulting in the production of pure water; a liquid fuel storage tank for holding liquid fuel produced in the low-pressure separator; a methane tank for the biochemical treatment of the sediment discharged from the settler and the low-pressure separator, resulting in the production of gas fuel containing mostly methane; a gas storage tank for holding gas fuel discharged from the methane tank; a drying disinfecting apparatus for the disinfecting and drying of solids discharged from the methane tank and the ultrafilter, resulting in the production of solid fertilizer; and a condenser for the purpose of condensing steam produced from the drying, disinfecting apparatus. Thereafter, the condensate formed is discharged into the sterilizer.

The wastewater cleaning system can be further comprised of a urea separator with two inlets through one of which the sediment from the low-pressure separator is introduced and the other through which needed reagents to improve the separation of urea are introduced from a dosing apparatus, and two outlets, through one of which flows the separated urea which is discharged to a drying and packaging apparatus and through the other of which sediment formed in the urea separator is introduced to the pump.

Another embodiment of the present invention includes a tank for holding the concentrate formed in the ultrafilter.

The above and other objects, features, and advantages of the present invention will become apparent to persons skilled in the art, especially when considered with the following description of the preferred embodiment, to be read in conjunction with the accompanying drawings.

DESCRIPTION OF THE DRAWINGS

Detailed description of the preferred embodiment of the invention will be made with reference to the accompanying drawings.

DETAILED DESCRIPTION OF THE EMBODIMENTS

Figure 1:
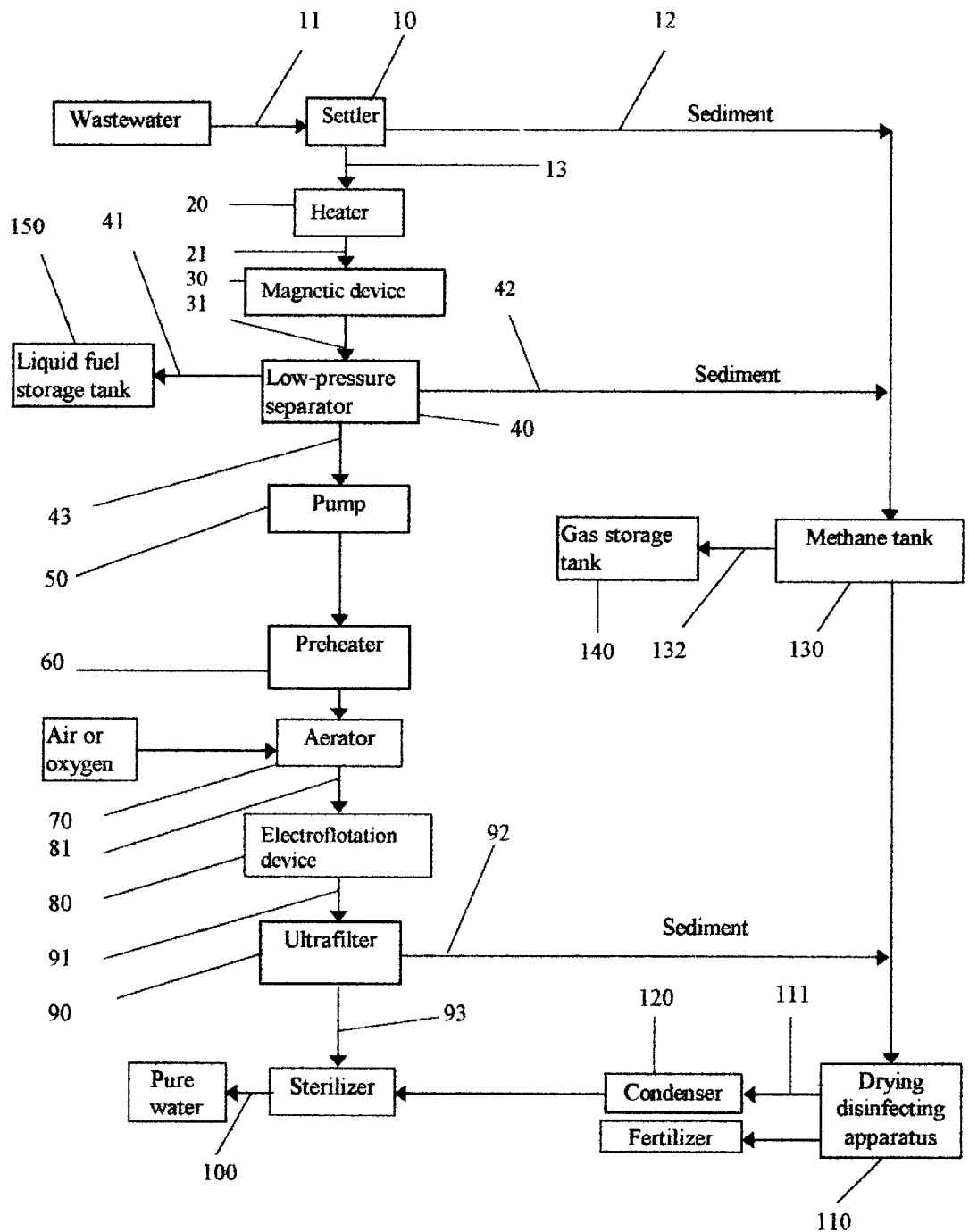
FIG. 1 shows a block diagram of the wastewater cleaning system in accordance with the first embodiment of the present invention.

As is shown in FIG. 1, wastewater is introduced into settler 10 via inlet 11 where wastewater is separated into two flows that are further moved into two parallel paths. One flow is formed from settled wastewater containing water-soluble compounds such as salts and urea, while the other flow is the sediment containing solids. Sediment is discharged into outlet 12 from settler 10 into methane tank 130. Settled wastewater is discharged into outlet 13 and then into heater 20 with outlet 21 through which the heated settled wastewater is discharged to magnetic device 30 with an outlet 31 through which heated settled wastewater is subsequently discharged into low-pressure separator 40. In low-pressure separator 40, heated settled wastewater is treated by pressure lower than ambient atmospheric pressure. As a result of this low-pressure air bubbles are formed in the heated settled wastewater. Fine suspended solids and oil droplets are separated from heated settled wastewater by flotation with these air bubbles and form liquid fuel that is discharged via outlet 41 into liquid fuel storage tank 150. At the bottom of the low-pressure separator 40 sediment is formed. This sediment is discharged from low-pressure separator 40 through outlet 42 and mixed with the sediment from settler 10. After the elimination of liquid fuel and sediment from the wastewater the result is pretreated wastewater. Pump 50 drains pretreated wastewater from low-pressure separator 40 into outlet 43 simultaneously creating pressure lower than ambient pressure in low-pressure separator 40. Pretreated wastewater is introduced into pre-heater 60 for heating and then into aerator 70 for treatment by oxygen or air. After oxidation, heated pretreated wastewater contains products of oxidation, dissolved and fine suspended organic substances, and other fine suspended solids that are introduced via inlet 81 into electroflotation device 80 for treatment by an electric current resulting in enlargement of these suspended solids. After treatment in electroflotation device 80 heated pretreated wastewater is introduced into ultrafilter 90 via inlet 91. The sediment from ultrafilter 90 is discharged via outlet 92. After cleaning in ultrafilter 90, this suspended heated pretreated domestic sewage forms effluent wastewater that is discharged from ultrafilter 90 via outlet 93 into sterilizer 100. Effluent wastewater in sterilizer 100 is disinfected by one of the existing methods, for example, by chlorination or ozonization, and forms pure water. That is to say, the treatment of settled wastewater in the above system results in pure water that can be used by consumers.

The second flow is formed by mixing sediment from settler 10 and sediment from low-pressure separator 40. This flow is introduced into methane tank 130. Gas fuel, containing mostly methane, and solids are formed in methane tank 130 during the biochemical treatment of the mixture containing sediments from both settler 10 and low-pressure separator 40. Gas fuel is introduced via outlet 132 into gas storage tank 140. Solids from methane tank 130 are mixed with solids from ultrafilter 90 and introduced into drying disinfecting apparatus 110 and disinfected, resulting in the formation of fertilizer. Steam from drying disinfecting apparatus 110 is introduced into condenser 120 via inlet 111 and is converted into water. This water is mixed with effluent wastewater and introduced into sterilizer 100 for disinfecting. Dry powder fertilizer is packed up before shipping.

Therefore, the above-described wastewater cleaning system provides for the treatment of wastewater mixed with oil and results in the production of pure water and fertilizer containing no contaminants that can pollute the environment. The system is simple and reliable in operation and requires equipment with a smaller volume in comparison to existing systems because 85% of contaminants are removed from the wastewater in the first stage of treatment. Pretreatment by heating before introducing the wastewater into the low-pressure separator and pretreatment by, an electric current before ultrafiltration increase the efficiency of the separation of solids.

Figure 2:
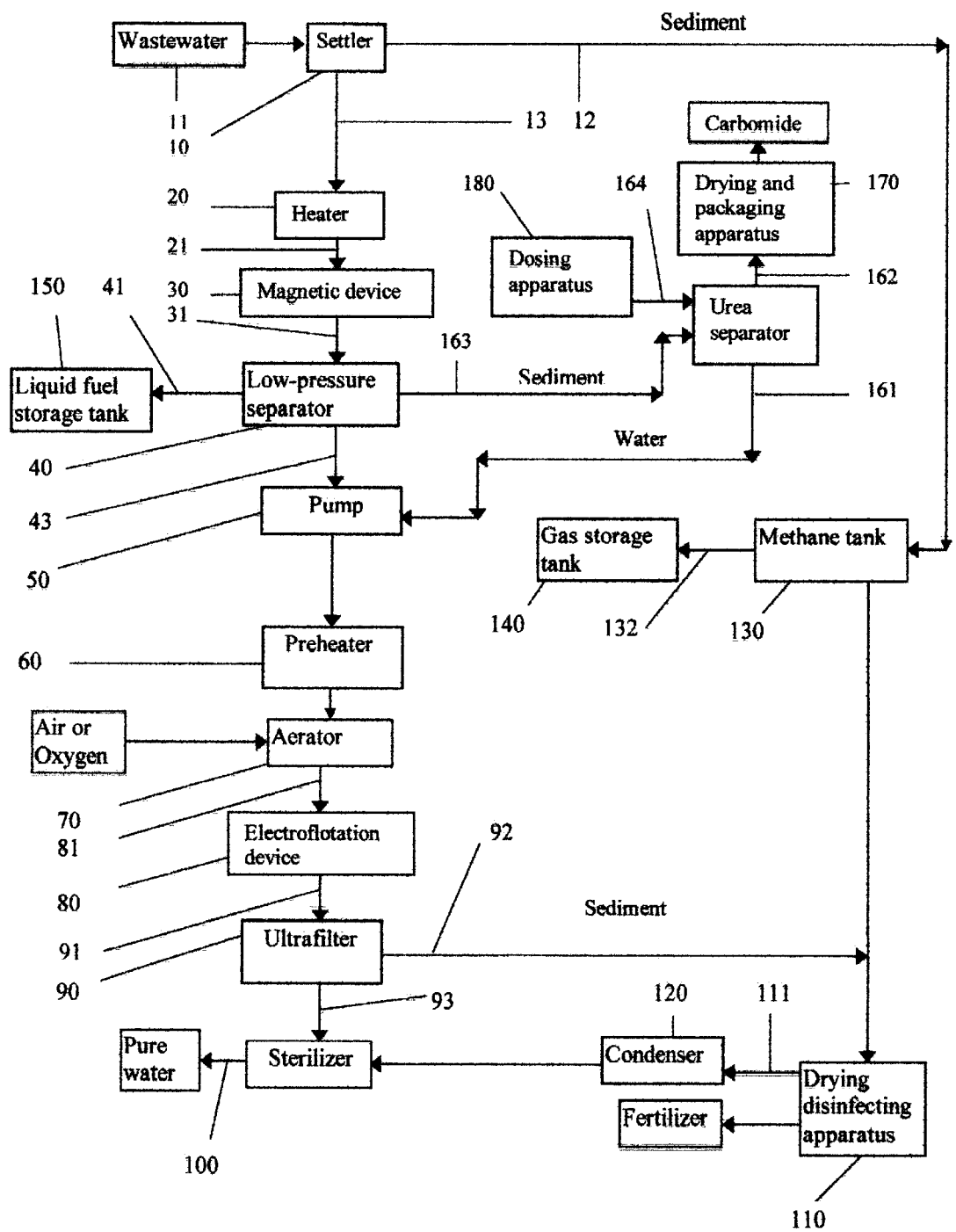
FIG. 2 shows a block diagram of wastewater cleaning system in accordance with FIG. 1 further comprised of a urea separator with two inlets through one of which the sediment from the low-pressure separator is introduced and another through which needed reagents to improve separation of urea are introduced from the dosing apparatus, and two outlets through one of which the separated urea is discharged to a drying and packaging apparatus and another through which a sediment formed in the urea separator is introduced to the pump.

FIG. 2 shows a block diagram of the wastewater cleaning system in accordance with FIG. 1 further comprised of a urea separator with two inlets through one of which, 163, the sediment from the low-pressure separator 40 is introduced into the urea separator, through another, 164, needed reagents to improve the separation of the urea are introduced from dosing apparatus 180, and two outlets through one of which, 162, the separated urea is discharged into a drying and packaging apparatus 170, and another, 161, is used for discharging the sediment formed in the urea separator to the pump 50. High quality fertilizer results from the utilization of pure urea.

Figure 3:
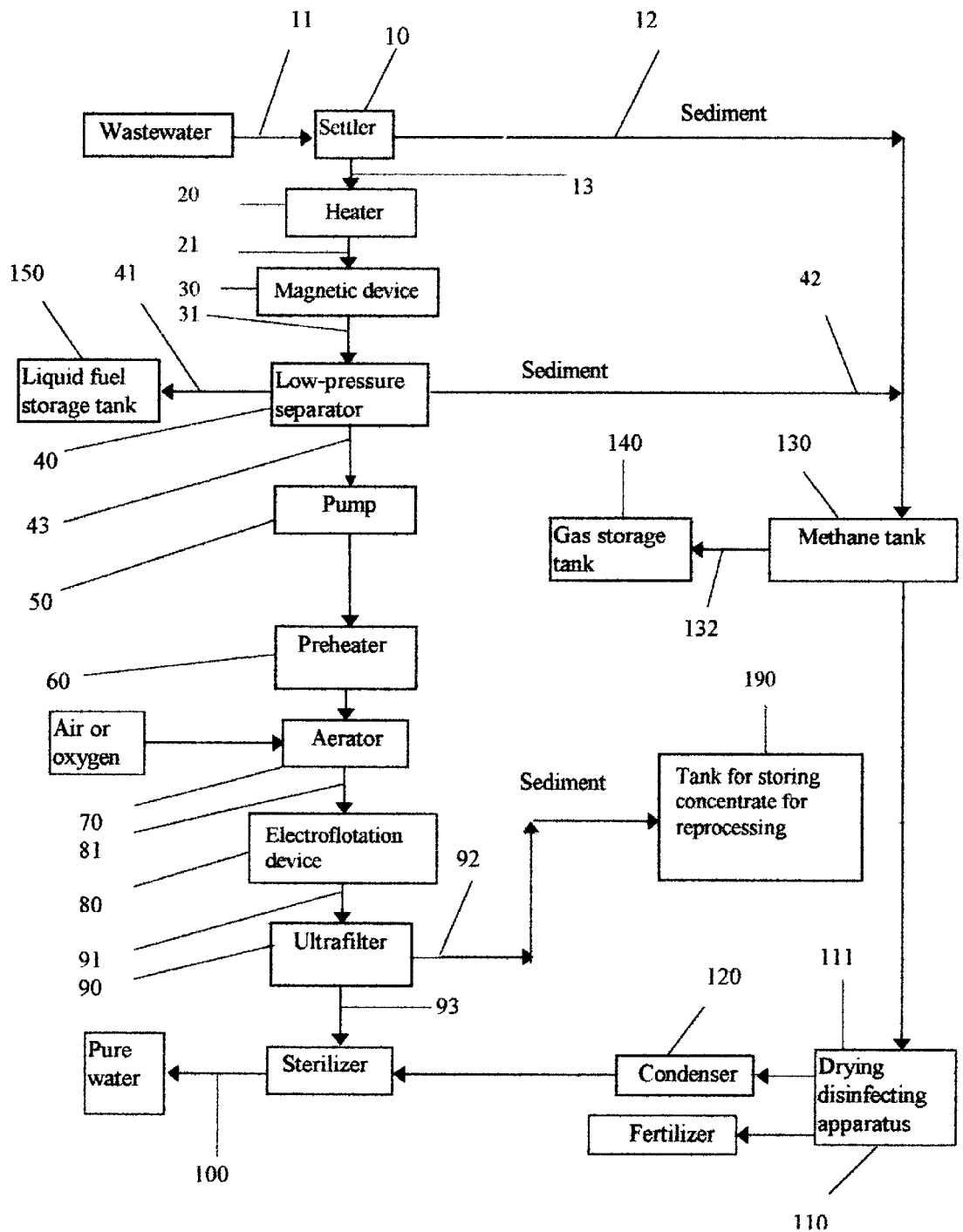
FIG. 3 shows a block diagram of the wastewater cleaning system in accordance with FIG. 1 further comprised of a tank for holding the concentrate formed in the ultrafilter.

FIG. 3 shows a block diagram of the wastewater cleaning system in accordance with FIG. 1, further comprised of a tank 190 for holding the concentrate formed in ultrafilter 90. In the situation wherein industrial wastewater contains different dissolved compounds including, for example, metal salts, these compounds concentrate in ultrafilter 90 and can be stored in tank 190 for further recovery.

We claim:

1. A wastewater cleaning system comprised of:
   a settler with an inlet through which raw wastewater is introduced, and two outlets through one of which settled wastewater is discharged and another through which sediment containing solids is discharged;
   a heater with an outlet through which said heated settled wastewater is discharged;
   a magnetic device with an outlet through which said heated settled wastewater is discharged;
   a low-pressure separator for the separation of suspended solid particles and oil droplets by means of flotation with air bubbles generated into said settled heated wastewater when the intake pressure becomes lower than ambient atmospheric pressure;
   a pump creating a pressure lower than ambient pressure in said low-pressure separator by draining through an outlet pretreated wastewater formed in said low-pressure separator;
   a pre-heater for heating said pretreated wastewater, which is introduced from said outlet of said pump;
   an aerator comprised of two inlets, through one of which, after heating, said pretreated wastewater is introduced from said pre-heater, through another said inlet, air or oxygen is introduced for oxidation of dissolved and fine suspended solid organic compounds present in said pretreated wastewater, and an outlet through which treated wastewater is discharged;

an electroflotation device for treating by means of an electrical current said pretreated wastewater introduced through said outlet of said aerator, and said electroflotation device is comprised of an outlet through which said treated wastewater is discharged;

an ultrafilter with an inlet through which treated wastewater is introduced from said electroflotation device for final cleaning of said treated wastewater, and two outlets through one of which after having been filtered out, solids are discharged, and through the other, formed effluent wastewater is discharged;

a sterilizer, with an inlet and an outlet, which receives effluent wastewater introduced from said ultrafilter and sterilizes said effluent wastewater to produce pure water that can be utilized by a consumer;

a liquid fuel storage tank for holding liquid fuel introduced from said low-pressure separator;

a methane tank comprised of an inlet through which said sediment from said settler and said low-pressure separator is introduced for the biochemical treatment resulting in the production of gas fuel containing mostly methane, and solid products, each discharged from said methane tank in two separate outlets;

a gas storage tank for holding gas fuel introduced from said methane tank;

a drying disinfecting apparatus for the disinfecting and drying of said solids discharged from said methane tank and said solids discharged from said ultrafilter, the result of which is the production of dry solid fertilizer discharged through one outlet and steam discharged through a second outlet;

a condenser with an inlet through which said steam, to be condensed, is introduced from said drying disinfecting apparatus, and an outlet for discharging formed condensate into the inlet of said sterilizer.

2. The wastewater cleaning system as stated in claim 1, further comprised of a urea separator with two inlets through one of which sediment from said low-pressure separator is introduced into said urea separator, through the other of which needed reagents to improve the separation of urea are introduced from a dosing apparatus, and two outlets through one of which said separated urea formed in said urea separator is discharged to a drying and packaging apparatus, while the other outlet is used for discharging sediment formed in said urea separator to said pump.

3. Wastewater cleaning system as stated in claim 1 further comprised of a tank for holding concentrate formed in said ultrafilter in the situation wherein industrial wastewater contains different minerals.

\* \* \* \* \*